(12) United States Patent
Cooper et al.

(10) Patent No.: US 6,816,463 B2
(45) Date of Patent: Nov. 9, 2004

(54) METHOD FOR MEASURING CHANNEL CHARACTERISTICS WITH THE INTERNET CONTROL MESSAGE PROTOCOL

(75) Inventors: Michael J. Cooper, Marietta, GA (US); Daniel T. Ryan, Carver, MA (US)

(73) Assignee: Motorola, INC, Schaumburg, IL (US)

(*) Notice: Subject to any disclaimer, the term of this patent is extended or adjusted under 35 U.S.C. 154(b) by 247 days.

(21) Appl. No.: 10/008,018

(22) Filed: Nov. 8, 2001

(65) Prior Publication Data

US 2002/0044531 A1 Apr. 18, 2002

Related U.S. Application Data

(63) Continuation-in-part of application No. 09/652,224, filed on Mar. 31, 1998.

(51) Int. Cl.[7] ............................................. H04L 12/26
(52) U.S. Cl. ...................................................... 370/248
(58) Field of Search ................................. 370/341, 247, 370/248, 249, 250, 251, 252, 431, 437, 464, 465

(56) References Cited

U.S. PATENT DOCUMENTS 5,627,766 A * 5/1997 Beaven ....................... 702/122
5,872,847 A    2/1999 Boyle et al.
5,959,974 A    9/1999 Badt et al.
6,553,041 B1 * 4/2003 Borneman et al. .......... 370/522

* cited by examiner

Primary Examiner—Wellington Chin
Assistant Examiner—Brenda Pham
(74) Attorney, Agent, or Firm—Esteban A. Rockett

(57) ABSTRACT

A method includes constructing a data pattern for generating a reference signal to measure a specific channel characteristic, inserting the data pattern in an Internet Control Message Protocol echo request, transmitting an Internet Control Message Protocol echo request from a primary station across a shared physical medium to a secondary station, receiving the echo request at the secondary station, transmitting an Internet Control Message Protocol echo reply in response to the echo request across the shared physical medium to the primary station, receiving the echo reply at the primary station, measuring a bit slicer error of the Internet Control Message Protocol echo reply, and characterizing the channel quality of the communications channel as a function of the bit slicer error. The corresponding channel quality may be measured for each of a plurality of channels in a multi-channel communications system of an Internet Protocol network and one of the plurality of channels may be selected having the best relative channel quality for routing a communications signal.

18 Claims, 4 Drawing Sheets

METHOD FOR MEASURING CHANNEL CHARACTERISTICS WITH THE INTERNET CONTROL MESSAGE PROTOCOL

CROSS-REFERENCE TO RELATED APPLICATIONS

This is a Continuation-in-Part of U.S. patent application Ser. No. 09/052,224 for SYSTEM, DEVICE, AND METHOD FOR SELECTING A CHANNEL IN A MULTICHANNEL COMMUNICATION NETWORK, by Steve Schroeder, et al., incorporated herein by reference.

FIELD OF THE INVENTION

The present invention relates generally to digital communications systems. More specifically, but without limitation thereto, the present invention relates to measuring the quality of a radio frequency channel used for routing message traffic in a digital communications system.

BACKGROUND OF THE INVENTION

Traditionally, Internet Protocol (IP) based networks have been implemented with baseband communications systems; however, the recent convergence of the Internet Protocol space with broadband communications has resulted in a shift to communications networks that can support multiple Internet Protocol networks. The multiple Internet Protocol networks may be multiplexed onto the same physical medium, wherein each network utilizes a unique channel or set of channels. Although Internet Protocol network multiplexing may be performed in a variety of dimensions including time, space, and frequency, the most common multiplexing technique currently implemented in the broadband cable industry is frequency multiplexing.

An important aspect of Internet Protocol network multiplexing is the characterization of each channel supported by the physical medium for a communications system. Several characteristics may be measured to assess the quality of a channel. For example, for a coaxial cable, these characteristics include noise floor level, ingress noise characteristic, group delay (or phase distortion), micro-reflections, and amplitude distortion. These characteristics are often dependent on the specific path and direction of the transmitted signal. For example, the channel characteristics for a signal transmitted from node 1 to node 2 may differ significantly from those for the same signal transmitted from node 1 to node 3 or even from node 2 to node 1.

As the number of available channels in a network increases, it becomes even more beneficial to monitor channel quality and to adapt communications parameters to maximize network performance. The communications parameters include, for example, channel hopping, modulation adaptation, error correction, and equalizer parameters including tap values and depth. A preferred method for characterizing a channel is to transmit a reference signal through the physical medium along a selected path between the transmitter and the receiver and to measure the received signal. Generating an adequate reference signal for characterizing a channel often requires the capability to vary both the duration and the spectral content of the reference signal. This capability may be met by selecting the length and content of the message carried by the reference signal. A problem with this approach is developing a protocol for requesting and generating the reference signal for each different communications system data path.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DESCRIPTION OF THE ILLUSTRATED EMBODIMENTS

The Internet Control Message Protocol (ICMP) provides a mechanism within the Internet Protocol (IP) for characterizing a channel. Using the transmitters and receivers that constitute a portion of the Internet Protocol based devices in an Internet Protocol network, an Internet Control Message Protocol echo request may be constructed that contains a reference message to be repeated back to the sender. The reference message has a length and content selected for measuring the channel quality. Several reference messages may be constructed having different lengths and contents for generating a channel characteristic for a variety of signals on a shared medium, and each of the reference messages may be identified by a corresponding Internet Control Message Protocol header identifier and sequence number. The Internet Control Message Protocol echo request is transmitted from a selected first node in the Internet Protocol network, received at a selected second node in the Internet Protocol network, and re-transmitted from the second node back to the first node as an Internet Control Message Protocol echo reply.

In one aspect of the present invention, a method includes constructing a data pattern for generating a reference signal to measure a specific channel characteristic, inserting the data pattern in an Internet Control Message Protocol echo request, transmitting an Internet Control Message Protocol echo request from a primary station across a shared physical medium to a secondary station, receiving the echo request at the secondary station, transmitting an Internet Control Message Protocol echo reply in response to the echo request across the shared physical medium to the primary station, receiving the echo reply at the primary station, measuring a bit slicer error of the Internet Control Message Protocol echo reply, and characterizing the channel quality of the communications channel as a function of the bit slicer error. The corresponding channel quality may be measured for each of a plurality of channels in a multi-channel communications system of an Internet Protocol network and one of the plurality of channels may be selected having the best relative channel quality for routing a communications signal.

Figure 1:
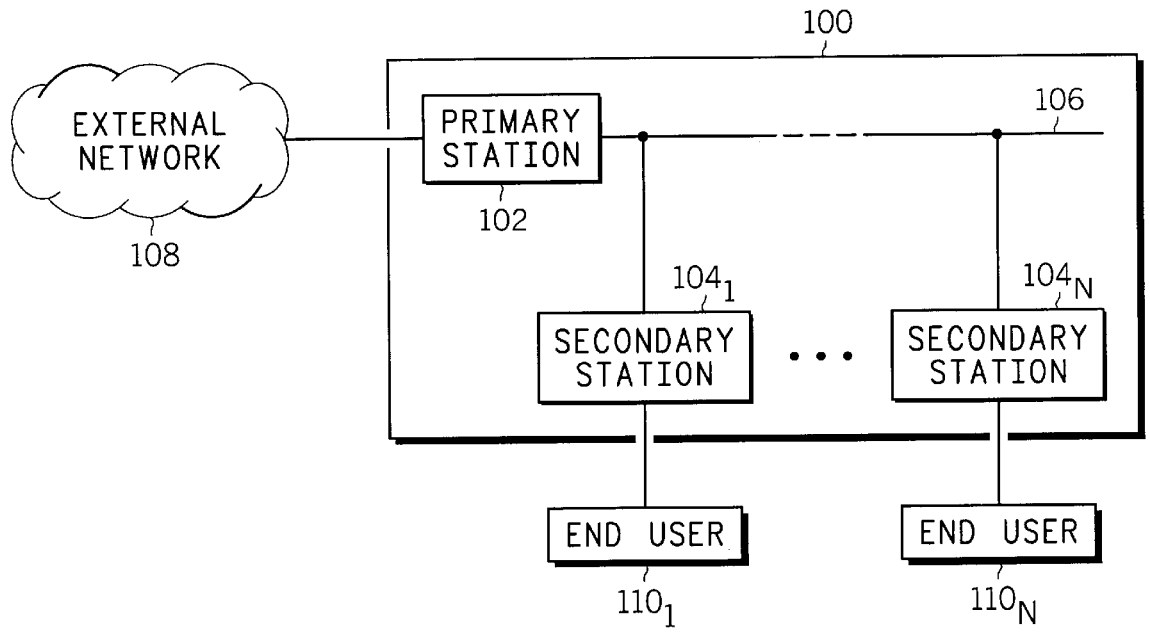
FIG. 1 illustrates a multichannel network in accordance with the present invention.

FIG. 1 illustrates a multichannel network 100 in accordance with the present invention. Shown in FIG. 1 are a primary station 102, secondary stations $104_1$ through $104_N$ (collectively referred to as the secondary stations 104), a shared physical medium 106, an external Internet Protocol (IP) network 108, and end users $110_1$ through $110_N$ (collectively referred to as the end users 110).

The multichannel network 100 includes a primary station 102 that is coupled to the external Internet Protocol network 108. The primary station 102 is coupled by the shared physical medium 106 to each of the secondary stations 104. Each of the end users 110 is coupled to a corresponding one of the secondary stations 104.

In operation, the multichannel network 100 provides access to the external Internet Protocol network 108 for each of the end users 110, acting as a conduit for transporting information between the end users 110 and the external network 108. The information is transported across the shared physical medium 106, which includes a plurality of channels. In a preferred embodiment, each channel is unidirectional; that is, each channel either carries information from the primary station 102 to the secondary stations 104 or from the secondary stations 104 to the primary station 102. The channels that carry information from the primary station 102 to the secondary stations 104 are typically referred to as downstream channels. Those channels that carry information from the secondary stations 104 to the primary station 102 are typically referred to as upstream channels.

Figure 2:
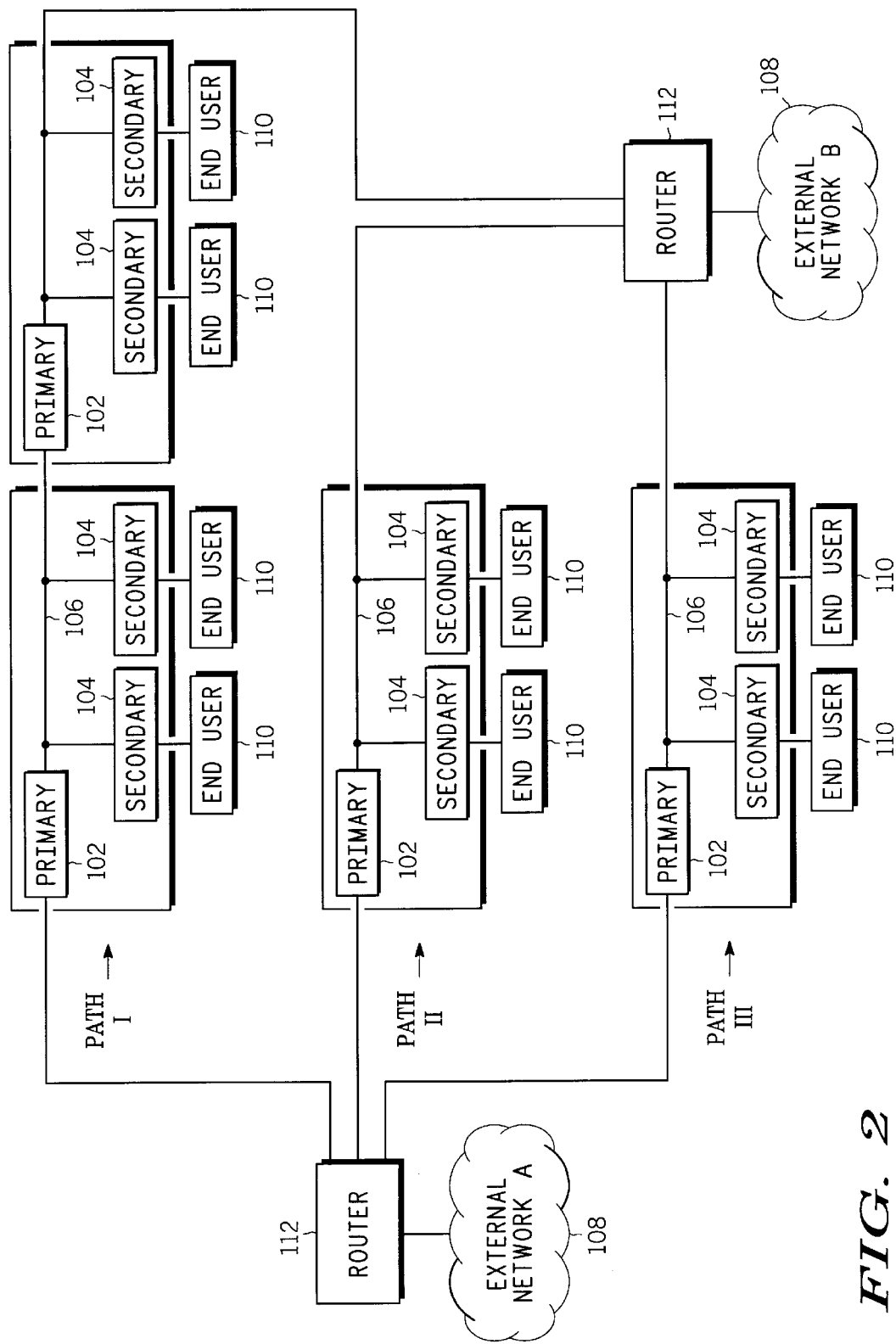
FIG. 2 illustrates a network of multiple multichannel networks of FIG. 1.

FIG. 2 illustrates a network of multiple multichannel networks 100. Shown in FIG. 2 are primary stations 102, secondary stations 104, a shared physical medium or media 106, external Internet Protocol (IP) networks 108, end users 110, routers 112, and paths I, II, and III.

The multiple multichannel networks 100 may separate external networks, for example the external networks 108. The channel quality metric measured within each individual multichannel network 100 may be used as a routing parameter to determine the best path for routing packets that must travel between the external networks 108. The channel quality metric may be constructed such that it represents the likelihood that a packet will propagate through the shared physical medium or media 106 uncorrupted. Similarly, if there are multiple multichannel networks 100 within a single path, for example, path I, then a composite quality channel quality metric may be calculated which combines the likelihood that a packet will propagate through each individual multichannel network 100 that lies in the path.

In alternative embodiments, various downstream and upstream channels may be multiplexed on the same physical channel, for example, through time division multiplexing. Further, various downstream and upstream channels may be multiplexed on separate physical channels, for example, through frequency division multiplexing/duplexing.

In a preferred embodiment, the multichannel network 100 is a data-over-cable (DOC) communications system in which the shared physical medium 106 is a hybrid fiber-optic and coaxial cable (HFC) network. The primary station 102 may be, for example, a headend device, typically referred to as a cable router. The secondary stations 104 may be, for example, cable modems. In other embodiments, the shared physical medium 106 may be one or more of coaxial cable, fiber-optic cable, twisted pair cable, etc. and may also include air, atmosphere, or space in wireless and satellite applications.

In the multichannel network 100, the downstream channels may be located, for example, in a frequency band above 50 MHz. The downstream channels may be classified as broadcast channels, because all information transmitted by the primary station 102 over a selected downstream channel is coupled to all of the secondary stations 104. Any of the secondary stations 104 that are tuned to receive on the selected downstream channel can receive the information.

The upstream channels may be located, for example, in a frequency band between about 5 MHz to about 42 MHz. The upstream channels may be classified as shared channels, because only one secondary station 104 can transmit on a selected upstream channel at any given time. Each of the secondary stations 104 therefore shares an upstream channel with other secondary stations 104. If more than one of the secondary stations 104 transmits on the same upstream channel at the same time, an information collision may occur that corrupts the information being carried by the channel.

To allow the multiple secondary stations 104 to share a single upstream channel with the primary station 102, various medium access control (MAC) protocols have been developed for use in data-over-cable (DOC) communications systems. These protocols may be generally categorized as contention-free protocols and contention-based protocols. Contention-free protocols, such as time division multiple access (TDMA) and round-robin polling, avoid collisions on the shared channel by various scheduling methods that authorize only one secondary station 104 to transmit on an upstream channel at any given time. Contention-based protocols, such as certain reservation based protocols, do not avoid collisions, rather they resolve collisions as they occur on the shared channel. In a preferred embodiment, the MAC protocol uses a combination of polling and contention-based reservation for scheduling upstream transmissions by the secondary stations 104.

The frequency band in which the upstream channels are located may expose the upstream channels to interference by outside sources such as home appliances and amateur radio devices, which often emit radio frequency energy in the 5 MHz to 42 MHz frequency band. Some upstream channels may therefore become unusable due to excessive outside interference, while other upstream channels remain usable. Other factors may result in an upstream channel becoming unusable due to equipment failure, such as a defective receiver in the primary station 102 or defective cabling constituting the shared physical medium 106.

In a preferred embodiment, the primary station 102 monitors each of the upstream channels to determine whether the channel is usable. For each upstream channel, the primary station maintains a channel quality estimate. As long as the channel quality estimate remains within a selected range, the channel is considered usable. If the channel quality estimate falls outside the selected range, however, the channel is considered to be unusable.

To determine the channel quality estimate, the primary station 102 calculates a bit slicer error for each burst transmission on an upstream channel. The functional block in a digital receiver that decodes symbols from a received signal and generates a stream of digital bits is referred to as a bit slicer. When demodulating a quadrature amplitude modulated (QAM) signal, the bit slicer estimates the amplitude and phase of the received symbol and selects the corresponding symbol having an amplitude and phase that most closely matches that of the received symbol. The difference between the amplitude and phase of the corresponding (ideal) symbol and the measured amplitude and phase of the received symbol is referred to as bit slicer error.

When noise corrupts the received symbol to the point where the measured symbol appears within the amplitude and phase decision boundaries of another symbol, a bit slicer error occurs. Several bit slicer error measurements may be averaged to generate an estimate of channel quality.

In situations in which an upstream channel is considered unusable, an alternate upstream channel may be selected and communications may be continued using the alternate upstream channel. The primary station 102 typically maintains a list of available upstream channels from which alternate upstream channels are selected. The alternate upstream channel may, however, be selected without regard to relative channel quality. As a result, the alternate upstream channel may also be unusable due to outside interference.

Two aspects of selecting an alternate upstream channel in accordance with a multichannel communications system of the present invention are the application of a relative channel quality measurement in the selection of an available upstream channel and the leveraging of a protocol that is already in place in Internet Protocol (IP) networks to generate the reference signal used to measure the relative channel quality.

In one embodiment of the present invention, the primary station 102 initiates a channel quality measurement. The primary station 102 includes logic for selecting a number of available channels from a list maintained for the communications network. The primary station 102 also includes logic for measuring a channel quality for each of the available channels and for selecting the channel having a selected channel quality measurement, typically the best channel quality relative to the other available channels.

Figure 3:
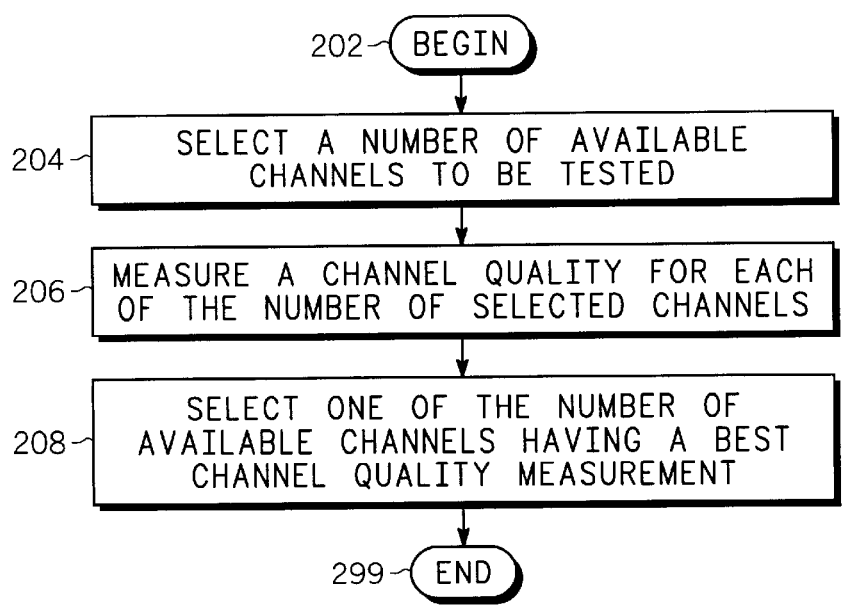
FIG. 3 illustrates a flow chart of a method for selecting an optimum available channel for the multichannel network of FIG. 1.

FIG. 3 illustrates a flow chart 200 of a method for selecting an optimum available channel for the multichannel network of FIG. 1.

Step 202 is the entry point for the flowchart 200.

In step 204, a number of available upstream channels is selected for estimating channel quality.

In step 206, the channel quality as represented by the bit slicer error is measured for each of the selected upstream channels.

In step 208, the upstream channel having the best channel quality is selected as the alternate upstream channel.

Step 299 is the exit point for the flowchart 200.

Figure 4:
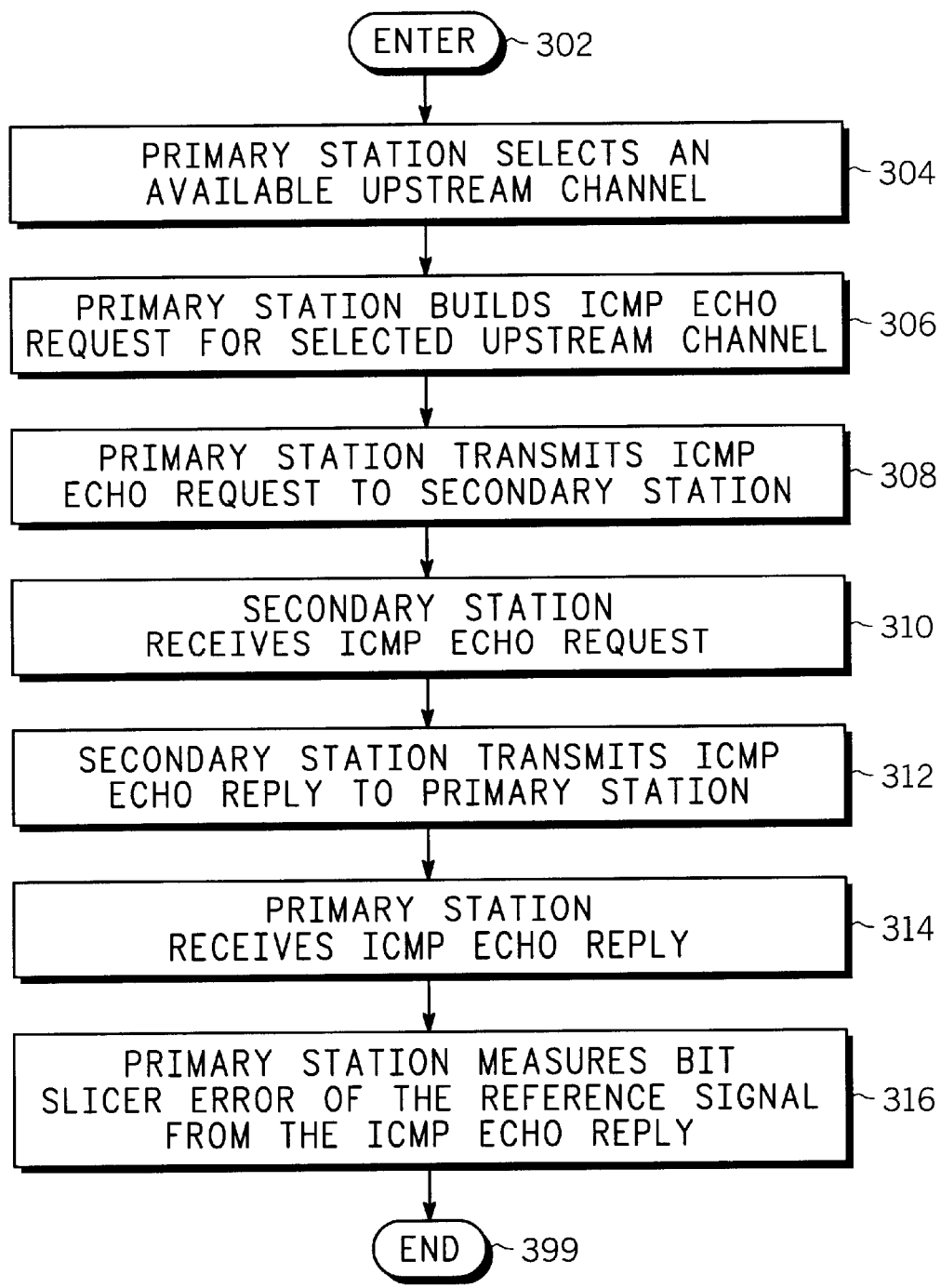
FIG. 4 illustrates a flow chart of a method for measuring channel quality for each available channel for the multichannel network of FIG. 1.

FIG. 4 illustrates a flow chart 300 of a method for measuring channel quality for each selected channel for the multichannel network of FIG. 1.

Step 302 is the entry point for the flowchart 300.

In step 304, the primary station 102 selects an available upstream channel from the list of available upstream channels.

In step 306, the primary station 102 builds a data pattern and inserts the data pattern in the data field of an Internet Control Message Protocol (ICMP) echo request. Alternatively, the data pattern may be selected from a table of previously constructed data patterns. In addition, the identifier and sequence number fields are set to uniquely identify the echo request. The Internet Control Message Protocol echo request is constructed according to a specific length and data pattern for testing a selected upstream channel quality. By selecting an appropriate length and content of the Internet Control Message Protocol echo request, a reference signal may be generated that magnifies the effect on the bit slicer error of a specific channel characteristic or condition. For example, amplitude distortion commonly caused by amplitude compression in the channel results in movement of the outer points of a constellation symbol mapping closer to the constellation center. The inner points of the constellation symbol mapping remain unaffected, however. By constructing a data pattern of the echo request message that produces symbols only at the outer points of the constellation symbol mapping, the resulting reference signal generates the maximum bit slicer error in a channel that is experiencing amplitude compression. Other data patterns for measuring specific channel characteristics may be constructed according to well known techniques.

In step 308, the primary station 102 transmits the Internet Control Message Protocol echo request to a selected secondary station over the shared physical medium.

In step 310, the selected secondary station 104 receives the Internet Control Message Protocol echo request.

In step 312, the selected secondary station 104 transmits an Internet Control Message Protocol echo reply to the primary station over the shared physical medium.

In step 314, the primary station 102 receives the Internet Control Message Protocol echo reply and matches the echo reply identifier and sequence number with the echo request to identify the specific data pattern unique to the channel characteristic being measured. The specific data pattern may then be correlated with the bit slicer error.

In step 316, the primary station 102 measures the bit slicer error of the reference signal from the Internet Control Message Protocol echo reply received from the secondary station.

Step 399 is the exit point for the flowchart 300.

The method illustrated in FIG. 4 may be used in step 206 of the flowchart 200 of FIG. 3 to measure the channel quality as a function of bit slicer error for each of the upstream channels between the primary station 102 and each of the secondary stations 104.

Although the flowcharts of the methods described above have been shown with reference to specific steps performed in a specific order, these steps may be combined, subdivided, or reordered in other embodiments without departing from the scope of the claims. Unless specifically indicated herein, the order and grouping of steps is not a limitation of the present invention.

In one embodiment, the channel quality measurement for each available upstream channel is made at the time an alternate upstream channel is to be selected, that is, when an upstream channel becomes unusable. The channel quality measurement may also be made periodically or on an ongoing basis, and the results may be stored in memory to anticipate selection of an alternate upstream channel.

The method of channel quality measurement described above may also be used for monitoring a group of active upstream channels by transmitting echo requests at periodic intervals between data transmissions. Based on the channel quality measurements, the primary station 102 may resume data transmissions using the upstream channels having the best channel quality. Using this technique, the primary station 102 may be able to predict and to react to changing channel characteristics before data loss occurs.

Figure 5:
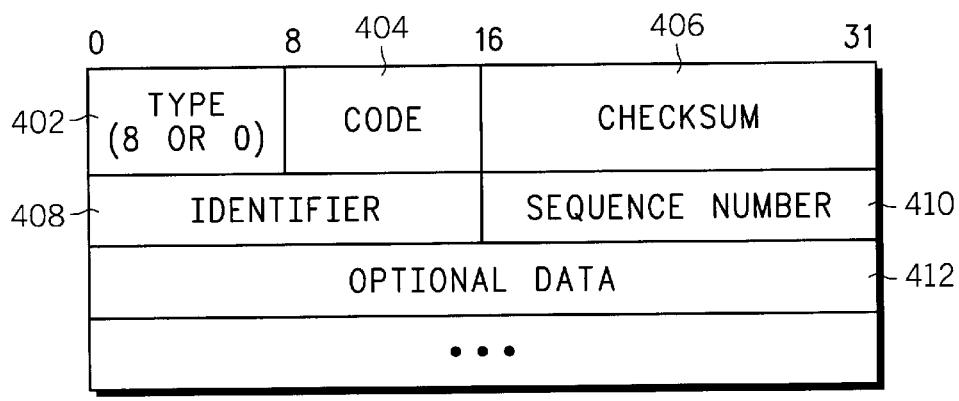
FIG. 5 illustrates the format of Internet Control Message Protocol echo request and reply messages for measuring bit slicer error for the multichannel network of FIG. 1.

FIG. 5 illustrates the format 400 of Internet Control Message Protocol echo request and reply messages for measuring bit slicer error in accordance with the present invention. Shown in FIG. 5 are a type field 402, a code field 404, a checksum field 406, an identifier field 408, a sequence number field 410, and an optional data field 412.

The type field 402 specifies the message as an echo request (8) or an echo reply (0). The code field 404 is set to (0) for an ICMP request and reply message. The checksum field 406 contains a checksum that is calculated for the message. The identifier field 408 and the sequence number field 410 are used by the primary station 102 to match an echo request to the corresponding echo reply and may also be used to specify one of several different previously built reference messages for generating reference signals having a variety of durations and contents for generating a channel quality profile of an upstream channel. The optional data field 412 contains the symbols that generate the desired duration and content of the reference signal. The symbols are transmitted using a selected set of encoding parameters and a selected modulation mode, for example, a form of phase shift keying (PSK) known as B/4 differential quadrature phase shift keying (B/4 DQPSK). The modulation mode may also be any of a number of alternative modulation modes, including 16-point quadrature amplitude modulation (16-QAM). The encoding parameters may include, for example, scrambling and block coding.

Advantageously, the Internet Control Message Protocol is already implemented in networks such as the Internet that are based on the Internet Protocol (IP), therefore there is no need to develop or import medium access control (MAC) protocols for the multichannel communications system 100.

Figure 6:
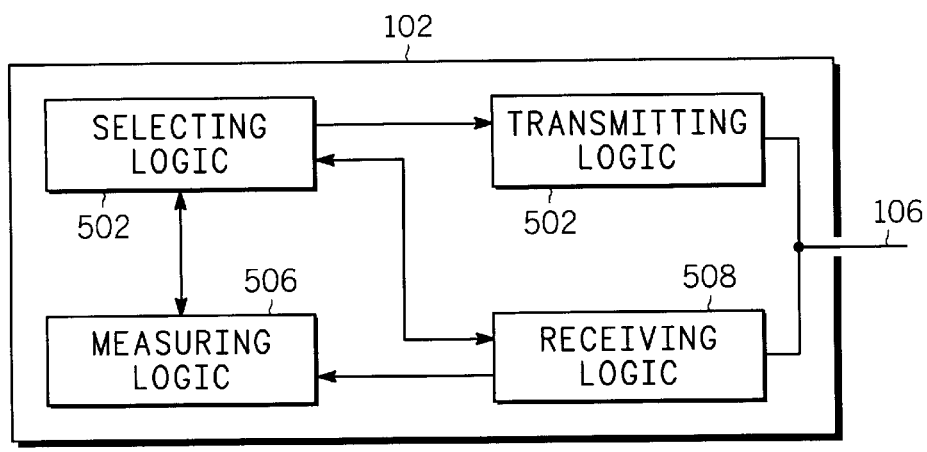
FIG. 6 illustrates a functional block diagram of a primary station for the multichannel network of FIG. 1.

FIG. 6 illustrates a functional block diagram of a primary station 102 for the multichannel network of FIG. 1. Shown in FIG. 6 are a selection logic module 502, a transmitting logic module 504, a measuring logic module 506, and a receiving logic module 508.

The selection logic module 502 is coupled to the transmitting logic module 504, the measuring logic module 506, and to the receiving logic module 508. The measuring logic module 506 is coupled to the receiving logic module 508. The transmitting logic module 504 and the receiving logic module 508 are coupled to the shared physical medium 106.

In operation, the selection logic module 502 selects one of the available upstream channels from the list of available upstream channels maintained by the primary station 102 for the multichannel communications network 100. The selection logic module 502 also selects the appropriate optional data field 412 and the length of the data to insert in the ICMP echo request to support a channel quality measurement. The transmitting logic module transmits an Internet Control Message Protocol (ICMP) echo request to the secondary station 104 in FIG. 1 connected to the selected available upstream channel by the shared physical medium 106. The receiving logic module 508 receives the Internet Control Message Protocol echo reply from the secondary station 104. The receiving logic module 508 decodes the symbols in the Internet Control Message Protocol echo reply and reports the bit slicing error to the measuring module 506. The measuring module 506 receives the bit slicing error from the receiving logic module 508 and generates a channel quality estimate as a function of the bit slicer error, for example, as an average or the mean square root of a series of bit slicing error measurements. The selection logic module 502 receives the channel quality estimate from the measuring module 506 and updates the channel quality for the corresponding available upstream channel relative to the other available upstream channels.

Figure 7:
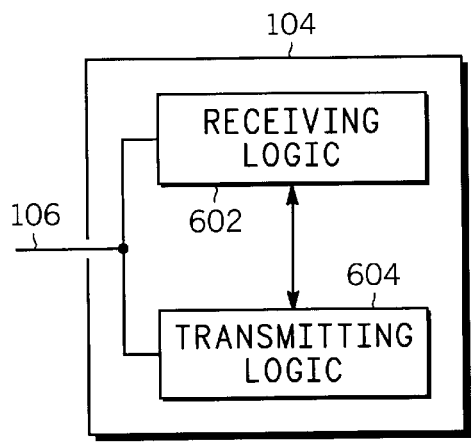
FIG. 7 illustrates a functional block diagram of a secondary station for the multichannel network of FIG. 1.

FIG. 7 illustrates a functional block diagram of a secondary station 104 for the multichannel network of FIG. 1. Shown in FIG. 7 are a receiving logic module 602 and a transmitting logic module 604.

The receiving logic module 602 and the transmitting logic module 604 are coupled to each other and to the shared physical medium 106.

In operation, the Internet Control Message Protocol echo request message is received by the receiving logic module 602 from the shared physical medium 106. According to the Internet Protocol built into the secondary station 104, the Internet Control Message Protocol echo request message data is passed to the transmitting logic module 604. The transmitting logic module 604 transmits the same data contained in the Internet Control Message Protocol echo request message in an Internet Control Message Protocol echo reply message across the selected upstream channel back to the primary station 102 in FIG. 1.

Each of the logic modules described above may be implemented according to well known techniques, for example, by discrete components, integrated circuitry, programmable logic devices such as a field programmable gate array (FPGA) or a microprocessor, or combinations thereof.

While the invention herein disclosed has been described by means of specific embodiments and applications thereof, other modifications, variations, and arrangements of the present invention may be made in accordance with the above teachings other than as specifically described to practice the invention within the spirit and scope defined by the following claims.

What is claimed is:

1. A method of characterizing channel quality for a communications channel comprising:
   constructing a data pattern for generating a reference signal to measure a specific channel characteristic;
   inserting the data pattern in an Internet Control Message Protocol echo request;
   transmitting the Internet Control Message Protocol echo request from a first station to a second station;
   receiving the Internet Control Message Protocol echo request at the second station;
   transmitting an Internet Control Message Protocol echo reply in response to the Internet Control Message Protocol echo request from the second station to the first station;
   receiving the Internet Control Message Protocol echo reply at the first station;
   measuring a bit slicer error of the Internet Control Message Protocol echo reply; and
   characterizing the channel quality of the communications channel as a function of the bit slicer error; and
   determining the channel quality of each of a plurality of communication channels and selecting one of the plurality of channels having a selected relative channel quality for routing a communications signal.

2. The method of claim 4 wherein the Internet Control Message Protocol echo request is transmitted from the first station to the second station over a shared physical medium.

3. The method of claim 4 wherein the shared physical medium is at least one of a coaxial cable, a fiber-optic cable, a twisted pair cable, air, atmosphere, and space.

4. The method of claim 1 wherein the selected relative channel quality is the best relative channel quality for the plurality of channels.

5. The method of claim 4 wherein the first station and the second station constitute at least part of a multichannel network.

6. The method of claim 5 wherein a plurality of multichannel networks lie in a path that separates external networks and wherein the path connects to the external networks through routers.

7. The method of claim 6 further comprising constructing a channel quality metric from the bit slicer error measured for each of the plurality of multichannel networks to determine a best path for routing packets between the external networks.

8. The method of claim 7 further comprising calculating a combined likelihood that a packet will propagate through the plurality of multichannel networks from the bit slicer error of each of the plurality of multichannel networks.

9. The method of claim 1 wherein the Internet Control Message Protocol echo request is transmitted periodically to anticipate selection of an alternate upstream channel.

10. The method of claim 1 wherein the Internet Control Message Protocol echo request is transmitted when an alternate upstream channel is to be selected.

11. The method of claim 1 wherein 1 transmitting an Internet Control Message Protocol echo request comprises selecting a length and a data pattern of the Internet Control Message Protocol echo request to magnify an effect of a specific channel characteristic on the bit slicer error.

12. The method of claim 11, wherein receiving the Internet Control Message Protocol echo reply comprises identifying the data pattern of the Internet Control Message Protocol echo request from a field of the Internet Control Message Protocol echo reply to correlate the bit slicer error with the specific channel characteristic.

13. The method of claim 11 further comprising selecting a data pattern of the Internet Control Message Protocol echo request that produces symbols only at outer points of a constellation symbol mapping to produce a resulting signal that generates a maximum slicer error in a channel that is experiencing amplitude compression.

14. A multichannel communications system comprising:
a first station for transmitting an echo request that conforms to Internet Control Message Protocol over a shared physical medium wherein the echo request contains a data pattern for generating a reference signal to characterize a channel quality from a bit slicer error; and
a second station for receiving the echo request and for transmitting an echo reply that conforms to Internet Control Message Protocol in response to the echo request from the second station to the first station; wherein the first station measures the channel quality for each of a plurality of channels and selects one of the plurality of channels having a relative channel quality for routing a communications signal.

15. The multichannel communications system of claim 14 wherein the shared physical medium is at least one of a coaxial cable, a fiber-optic cable, a twisted pair cable, air, atmosphere, and space.

16. The multichannel communications system of claim 14 wherein the relative channel quality is the best relative channel quality for the plurality of channels.

17. The multichannel communications system of claim 14 wherein the first station and the second station constitute at least part of a multichannel network.

18. The multichannel communications system of claim 17 comprising a plurality of multichannel networks that lie in a path between external networks and routers that connect the path to the external networks.

* * * * *